(12) United States Patent
Ko et al.

(10) Patent No.: US 9,525,532 B2
(45) Date of Patent: *Dec. 20, 2016

(54) METHOD AND APPARATUS FOR SPATIAL MODULATION

(71) Applicant: LG Electronics Inc., Seoul (KR)

(72) Inventors: Hyunsoo Ko, Seoul (KR); Heejeong Cho, Seoul (KR); Hyeyoung Choi, Seoul (KR); Ilmu Byun, Seoul (KR); Kungmin Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/967,847

(22) Filed: Dec. 14, 2015

(65) Prior Publication Data
US 2016/0261390 A1 Sep. 8, 2016

Related U.S. Application Data

(63) Continuation of application No. 14/636,803, filed on Mar. 3, 2015, now Pat. No. 9,246,561.

(51) Int. Cl.
*H04B 7/02* (2006.01)
*H04L 5/00* (2006.01)
*H04B 7/04* (2006.01)

(52) U.S. Cl.
CPC ........... *H04L 5/0048* (2013.01); *H04B 7/0413* (2013.01)

(58) Field of Classification Search
CPC .... H04L 5/0048; H04L 5/0005; H04B 7/0413; H04B 7/0417; H04B 7/061; H04B 7/0697

USPC .......................................................... 375/267
See application file for complete search history.

(56) References Cited

U.S. PATENT DOCUMENTS

| | | | | |
|---|---|---|---|---|
| 7,120,395 B2* | 10/2006 | Tong | ...................... | H04B 7/061 375/349 |
| 8,331,478 B2* | 12/2012 | Harrison | .............. | H04B 7/0678 341/173 |
| 2007/0099584 A1* | 5/2007 | Niu | .......................... | H04B 7/04 455/101 |
| 2011/0170575 A1* | 7/2011 | Harrison | .............. | H04B 7/0678 375/146 |
| 2014/0098689 A1* | 4/2014 | Lee | ...................... | H04B 7/0469 370/252 |

FOREIGN PATENT DOCUMENTS

WO WO 2006049443 A1 * 5/2006 ........... H04B 7/0669

\* cited by examiner

*Primary Examiner* — Juan A Torres
(74) *Attorney, Agent, or Firm* — Dentons US LLP

(57) ABSTRACT

A method of transmitting signals by a transmitting side device having multiple antennas (hereinafter 'N antennas') is disclosed. In this method, the transmitting side device transmits reference signals (RSs) via M antenna among the N antennas, where M≤N, where one or more of M and a sequence of antenna numbers used for transmitting RSs informs a receiving side device of first information for data transmission, and where the RSs are used by the receiving side device for identifying second information for channel estimation. Transmitting side device transmits data to the receiving side device according to the first information.

10 Claims, 10 Drawing Sheets

(a)

(b)

(a)

(b)

METHOD AND APPARATUS FOR SPATIAL MODULATION

This application is a Continuation of U.S. application Ser. No. 14/636,803 filed Mar. 3, 2015, which is hereby incorporated by reference in their entirety.

BACKGROUND OF THE INVENTION

Field of the Invention

The present invention relates to a wireless communication system, and more particularly, to an efficient spatial modulation scheme for achieving diversity gain and high transmission rate.

Discussion of the Related Art

As an example of a wireless communication system to which the present invention is applicable, a 3rd generation partnership project (3GPP) long term evolution (LTE) communication system will be schematically described.

FIG. 1 is a schematic diagram showing a network structure of an evolved universal mobile telecommunications system (E-UMTS) as an example of a wireless communication system. The E-UMTS is an evolved form of the legacy UMTS and has been standardized in the 3GPP. In general, the E-UMTS is also called an LTE system. For details of the technical specification of the UMTS and the E-UMTS, refer to Release 7 and Release 8 of "3rd Generation Partnership Project; Technical Specification Group Radio Access Network".

Referring to FIG. 1, the E-UMTS includes a user equipment (UE), an evolved node B (eNode B or eNB), and an access gateway (AG) which is located at an end of an evolved UMTS terrestrial radio access network (E-UTRAN) and connected to an external network. The eNB may simultaneously transmit multiple data streams for a broadcast service, a multicast service and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

In order to improve performance of the related art LTE communication system mentioned in the above description, ongoing discussions are made on 5G communication technology. And, the 5G communication system is expected to use spatial modulation scheme based on massive MIMO technology.

FIG. 2 is a diagram showing a difference between spatial multiplexing and spatial modulation.

FIG. 2 (a) is a diagram for explaining the spatial multiplexing scheme. According to spatial multiplexing scheme, different signals ($S_1$ and $S_2$) are transmitted via different transmission antennas. On the other hand, FIG. 2 (b) is a diagram for explaining the spatial modulation scheme. According to spatial modulation scheme, $S_1$ is transmitted via antenna 0 or 1, and selection of antenna 0/1 represents $S_2$. That is, $S_2$ can be represent not based on the signals transmitted via each antenna, but based on selection of antennas for transmission.

So, spatial modulation (SM) can be referred to as a single-RF multiple-antenna transmission technique. The smaller RF-chain number and low detection complexity at the receiver of spatial modulation make it an energy-efficient modulation method for the massive MIMO system. According to Massive MIMO scheme to be employed to 5G standardization technology, the targeted MIMO dimension may amount up to hundreds of antennas and the transmitter and receiver.

However, the above explained spatial modulation has a problem in that it may suffer antenna specific error. For example, when the channel of antenna 0 is poor in the example of FIG. 2 (b), the transmission of $S_1$ via antenna 0 might fail. So, the spatial modulation has to be modified to have spatial diversity gain.

Further, the transmission rate of spatial modulation is lower than spatial multiplexing scheme. For example, when there are Nt transmission antennas, and one symbol ($S_1$) represents M information, the spatial multiplexing scheme can convey $N_t \log_2(M)$ bits for one transmission. On the other hand, for the same environment, spatial modulation scheme can convey $\log_2(N_t)+\log_2(M)$ bit for one transmission.

SUMMARY OF THE INVENTION

Accordingly, the present invention is directed to methods for efficient spatial modulation scheme to acquire diversity gain and high transmission rate.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of transmitting signals by a transmitting side device having multiple antennas (hereinafter 'N antennas'), the method comprising: transmitting reference signals (RSs) via M antenna among the N antennas, wherein M≤N, wherein one or more of M and a sequence of antenna numbers used for transmitting RSs informs a receiving side device of first information for data transmission, and wherein the RSs are used by the receiving side device for identifying second information for channel estimation; and transmitting data to the receiving side device according to the first information, is provided.

The first information may be represented based on a RS pattern for each of M antennas. Different RS patterns may be defined by using different time-frequency resources of one antenna.

The first information may comprise modulation order of the data to be transmitted. The first information may comprise which of MIMO transmission schemes is used for data transmission. The first information may comprise information for spatial modulation for data transmission. Here, the information for spatial modulation may comprise a number of antennas used for data transmission and a relation between a sequence of antenna pattern and a represented signal.

In another aspect of the present invention, a method of receiving signals transmitted via multiple transmission antennas (hereinafter 'N transmission antennas') by a receiving side device, the method comprising: detecting reference signals (RSs) transmitted via M transmission antenna among the N transmission antennas, wherein M≤N, wherein one or more of M and a sequence of RS detected transmission antenna numbers informs the receiving side device of first information for data transmission; estimating channels based on the received RSs by identifying second information for channel estimation; and receiving data from a transmitting side device based on the first information, is provided.

The first information may be represented based on a RS pattern for each of M antennas.

Different RS patterns may be defined by using different time-frequency resources of one antenna.

The first information may comprise modulation order of the data to be transmitted, which of MIMO transmission schemes is used for data transmission, and/or information for spatial modulation for data transmission.

The information for spatial modulation may comprise a number of antennas used for data transmission and a relation between a sequence of antenna pattern and a represented signal.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF THE INVENTION

The configuration, operation and other features of the present invention will be understood by the embodiments of the present invention described with reference to the accompanying drawings. The following embodiments are examples of applying the technical features of the present invention to a 3rd generation partnership project (3GPP) system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition.

Figure 1:
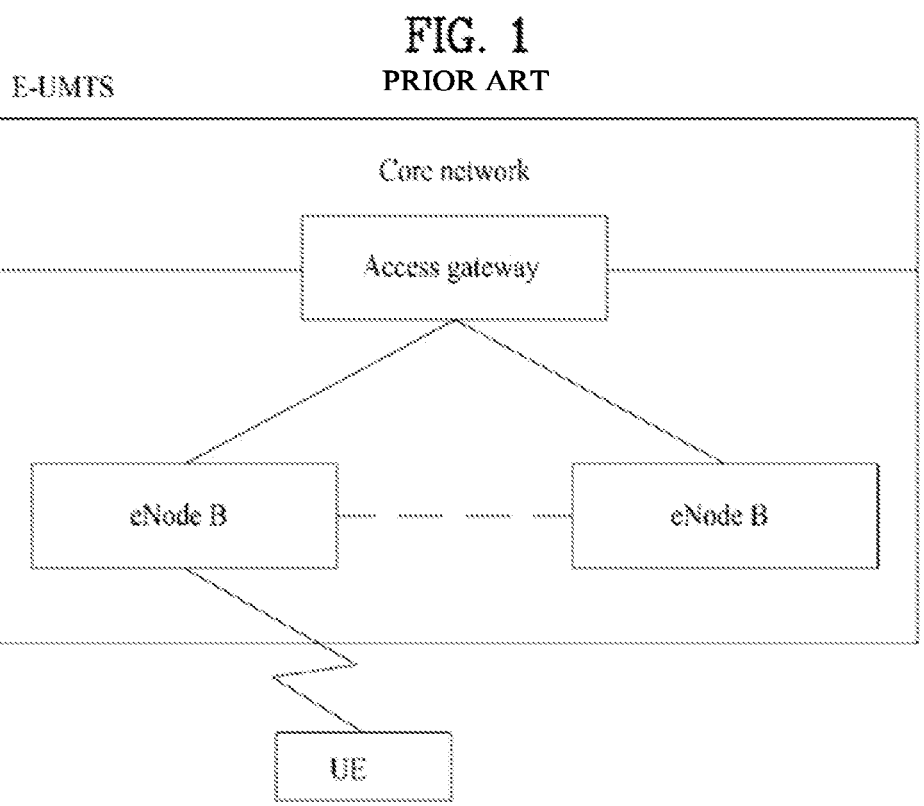
FIG. 1 is a schematic block diagram of E-UMTS network structure as one example of a wireless communication system.
Figure 2:
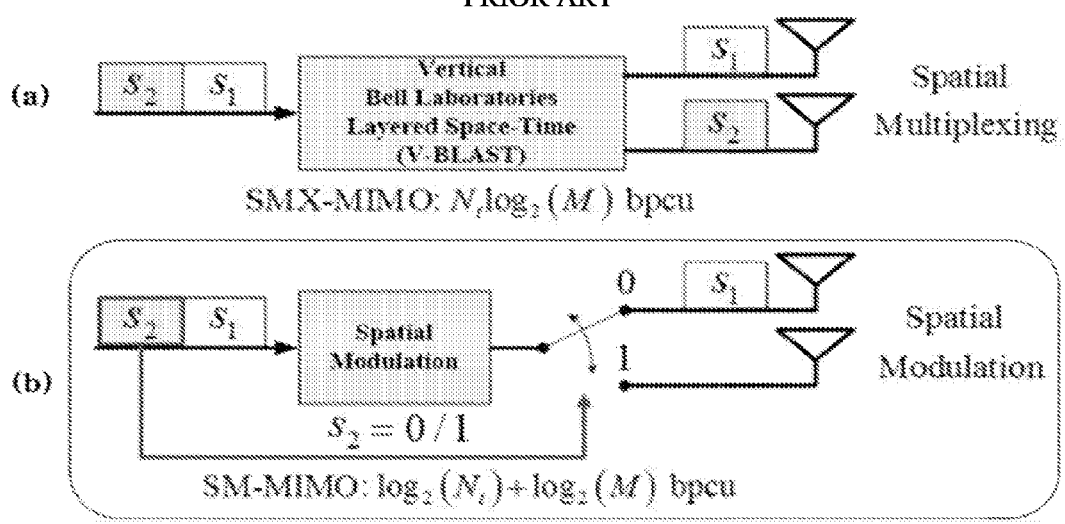
FIGS. 2 (a) and (b) are diagrams showing a difference between spatial multiplexing and spatial modulation.
Figure 3:
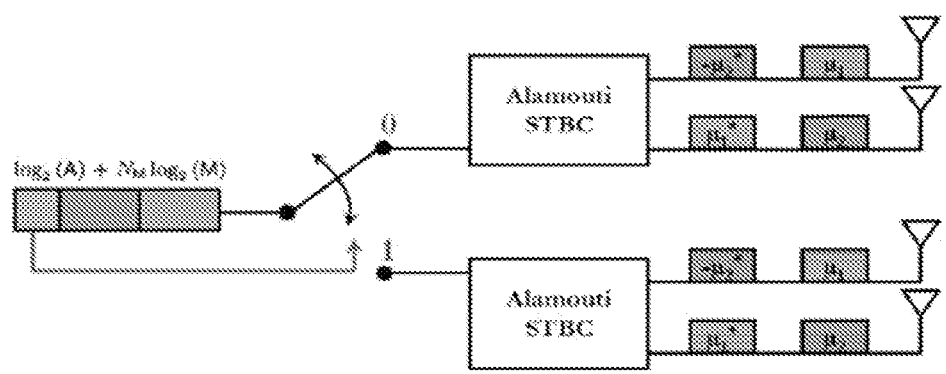
FIG. 3 is a diagram for explaining spatial modulation scheme combined with Alamouti scheme to be used for the present invention.

FIG. 3 is a diagram for explaining spatial modulation scheme combined with Alamouti scheme to be used for the present invention.

For this combined scheme, first step is antenna selection for bit mapping in spatial constellation as a spatial modulation scheme. For example of transmitting information 'A', 'B' and 'C', information 'A' can be represented by selection of antenna block 0 or 1. In FIG. 3, each antenna block comprises 2 antennas.

Then the information 'B' and 'C' can be transmitted based on Alamouti scheme for signal constellation. The transmission of information 'B' and 'C' is performed via 2 antenna of the selected antenna block based on the information 'A'.

When the information 'B' and 'C' are correctively represented as the information 'M', the transmission rate for this combined scheme can be represented as:

$$R = \log_2(A) + \frac{N_M \log_2(M)}{T_S} \qquad \text{[Equation 1]}$$

Here, Ts represents transmission time for transmitting information 'M' and $N_M$ represents the number of antennas for each antenna block selected based on the information 'A'.

When this combined scheme is represented as codeword structure, it can be represented as:

$$\{X_{11}, X_{12}\} = \left\{ \begin{pmatrix} x_1 & x_2 & 0 & 0 \\ -x_2^* & x_1^* & 0 & 0 \end{pmatrix}, \begin{pmatrix} 0 & 0 & x_1 & x_2 \\ 0 & 0 & -x_2^* & x_1^* \end{pmatrix} \right\} \qquad \text{[Equation 2]}$$

Figure 4:
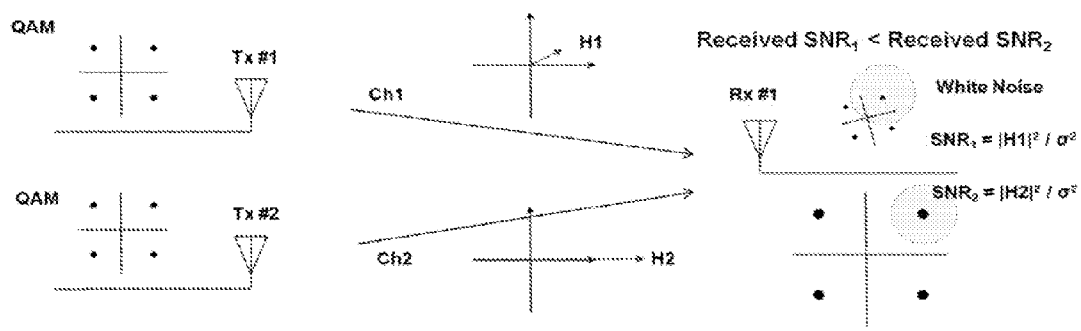
FIG. 4 is a diagram for explaining spatial modulation scheme combined with QAM scheme to be used for the present invention.

FIG. 4 is a diagram for explaining spatial modulation scheme combined with QAM scheme to be used for the present invention.

Spatial modulation scheme is a scheme representing information based on the difference between the spatial channels of each antenna. So, when each of antennas are independent from each other, the information can be easily distinguished. Contrary, when each of channels has high correlation, it is hard for the receiving side device to distinguish the information. So, the spatial modulation scheme is preferable for a case when each antenna is independent from each other.

In order to increase the transmission rate, QAM modulation scheme can be combined with spatial modulation scheme. That is, each antenna can transmit QAM modulated symbol in this combined method. For example, when there are 4 transmission antennas and each antenna transmits QAM modulated symbol, total 4 bits information can be transmitted at one transmission instance.

On the other hand, QAM symbol detection performance is dependent on the amplitude of channel. So, if one specific channel among the transmission channels of multiple antennas is small, the performance of this transmission scheme would be depend on that specific channel.

For example of FIG. 4, if the channel H1 of transmission antenna #1 is much smaller than the channel H2 of transmission antenna #2, the received SNR of H1 would be much smaller than the received SNT of H2. So, the performance of spatial modulation would be determined based on this poor channel, H1.

Figure 5:
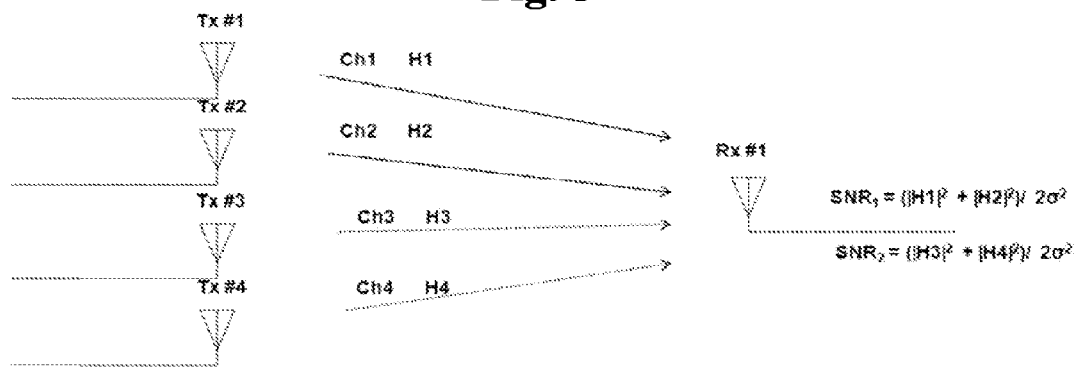
FIG. 5 is a diagram for explaining SNR of the received signals when spatial modulation scheme is combined with Alamouti scheme.

FIG. 5 is a diagram for explaining SNR of the received signals when spatial modulation scheme is combined with Alamouti scheme.

As stated above, the performance of spatial modulation scheme is determined based on specific poor channel among multiple channels. It is because the spatial modulation scheme reduce the spatial diversity gain.

To address this problem, the spatial modulation scheme can be used together with Alamouti scheme. Suppose there are 4 transmission antennas (Tx #1~Tx #4; as shown in FIG. 5) and each channel is represented as H1~H4. When Alamouti scheme is used by grouping the transmission antennas, the SNR1 and SNR 2 would be represented as:

$$SNR_1 = (|H1|^2 + |H2|^2)/2\sigma^2$$

$$SNR_2 = (|H3|^2 + |H4|^3)/2\sigma^2 \quad \text{[Equation 3]}$$

Even when the spatial modulation is combined with Alamouti scheme, the performance of this scheme would be determined based on poor combination among the above two antenna group. For example, when SNR1 is much less than SNR 2, the performance would be determined based on SNR1.

Figure 6:
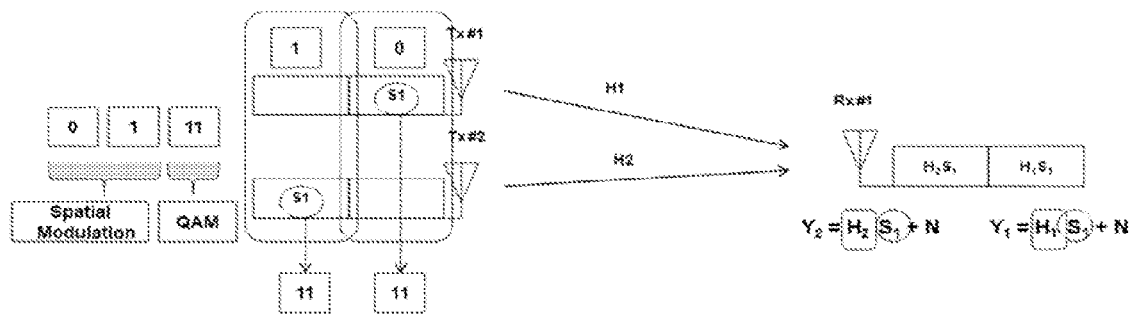
FIG. 6 is a diagram for explaining one exemplary spatial modulation scheme of present invention.

FIG. 6 is a diagram for explaining one exemplary spatial modulation scheme of present invention.

In order to achieve the antenna diversity gain, each symbol may be transmitted through multiple antennas, not just one antenna. For example, referring to FIG. 6, the information to be represented by spatial modulation is '01' and the information to be represented based on QAM is '11'. '0' for spatial modulation represents that the QAM symbol is transmitted via transmission antenna #1 and '1' for spatial modulation represents the QAM symbol is transmitted via transmission antenna #2.

In this example of the present invention, the information to be represented by spatial modulation comprises '01' and '10', but '00' and '11' are not used for representing information. So, the QAM symbol '11' would be transmitted via 2 transmission antennas regardless the information to be represented by spatial modulation.

In this case, the received signals for both of the information would be the same (only the sequence of the received signals would be different). So, the performance of this scheme can be averaged over the multiple antennas.

Figure 7:
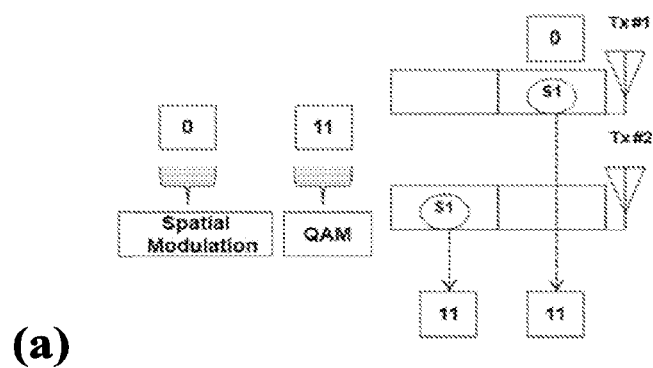
FIGS. 7 (a) and (b) are diagrams for explaining another exemplary spatial modulation scheme of present invention.
Figure 7:
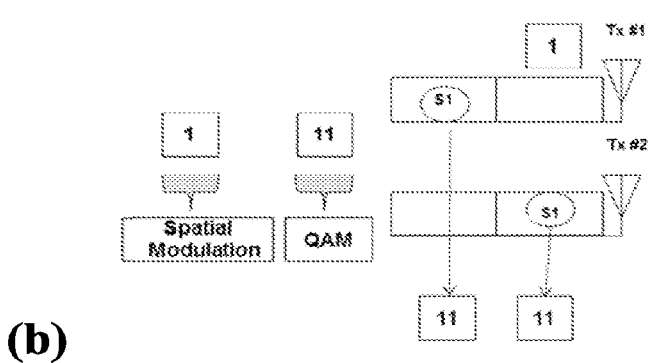

FIG. 7 is a diagram for explaining another exemplary spatial modulation scheme of present invention.

In this example, antenna patterns for representing information may be predetermined. And, this antenna pattern ensures that the signals are transmitted via multiple antennas.

As shown in the example of FIG. 7 (a), '0' is predetermined to be represented by transmission of S1 via Tx #1 first, then via Tx #2. In FIG. 7 (b), '1' is predetermined to be represented by transmission of S1 via Tx #2 first, then via Tx #1. Note that S1 would be transmitted both of Tx #1 and Tx #2 in any case.

In this example, QAM symbol S1 is represented as '11'.

Figure 8:
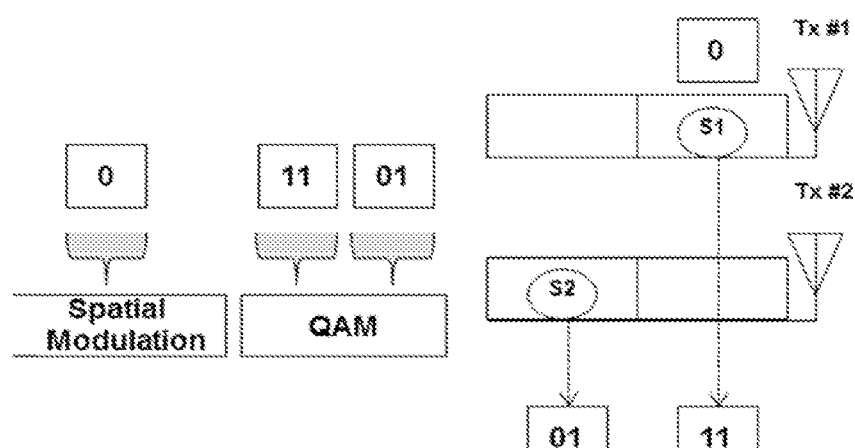
FIGS. 8 (a) and (b) are diagrams for explaining another exemplary spatial modulation scheme of present invention.
Figure 8:
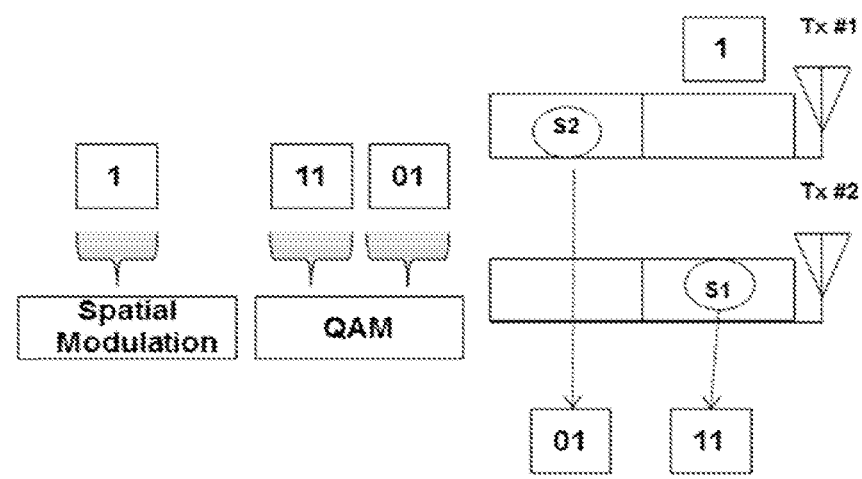

FIG. 8 is a diagram for explaining another exemplary spatial modulation scheme of present invention.

FIG. 8 is similar in that the antenna pattern for transmitting QAM symbol is predetermined to represent specific information. But, in this example, the transmission pattern of the combination of multiple symbols (e.g. S1 and S2) is used for representing information for spatial modulation.

Suppose '11' represents 'S1' and '01' is represents 'S2'. Both of them are QAM modulation symbols.

In this example, as shown in FIG. 8 (a), '0' for spatial modulation is predetermined to be represented by transmitting S1 via Tx #1 first, then S2 via Tx #2. '1' for spatial modulation is predetermined to be represented by transmitting S1 via Tx #2 first, then S2 via Tx #1.

By using the above explained method, the SNR of the received symbols would be averaged over multiple channels, so the performance would not be determined based on the poorest channel.

But, the above method may reduce the transmission rate somewhat since the transmission of one QAM symbol takes multiple resources.

Figure 9:
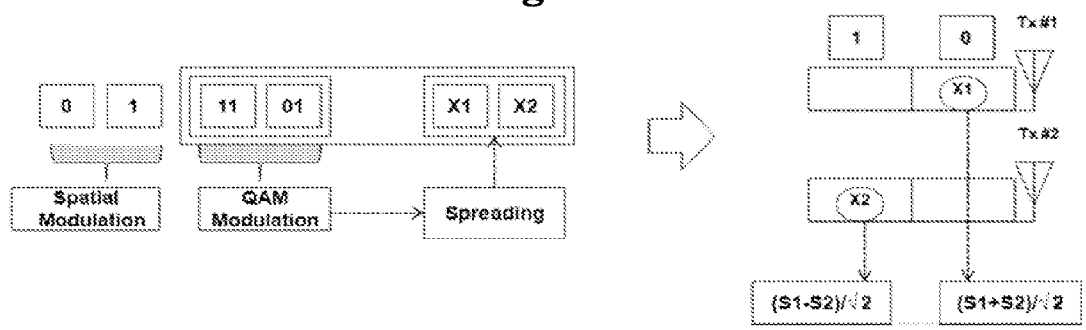
FIG. 9 is a diagram for explaining preferred example of the present invention.

FIG. 9 is a diagram for explaining preferred example of the present invention.

In this example of the present invention, the signals are transmitted via multiple resources as the examples previously explained. In addition to this, the present example proposes to multiplex the signals as on multiplexed signals and transmits this multiplexed signals via multiple resources to increase the transmission rate.

For example, when the symbols S1 is to be transmitted via antennas 1 and 2, the transmission rate would be reduce in half. But, when the symbols S1 and S2 are multiplexed as X1 (X1=(S1−S2)/√2), and when X1 is transmitted via antennas 1 and 2, there would be no reduction in transmission rate according to the present invention.

Multiplexed signals can be acquired based on Hadamard code or DFT.

The number of multiplexed signals into one symbol would be determined based on the number of transmission antennas to be used for transmitting that one multiplied symbol.

In the example of FIG. 9, spatial modulation codes '01' and '10' can be used. And, symbols S1 (11) and S2 (01) can be multiplexed as X1 and X2 by:

$$X1 = (S1 + S2)/\sqrt{2}$$

$$X2 = (S1 - S2)/\sqrt{2} \quad \text{[Equation 4]}$$

By using this scheme, spatial modulation scheme can be modified to have diversity gain without the reduction of transmission rate.

Figure 10:
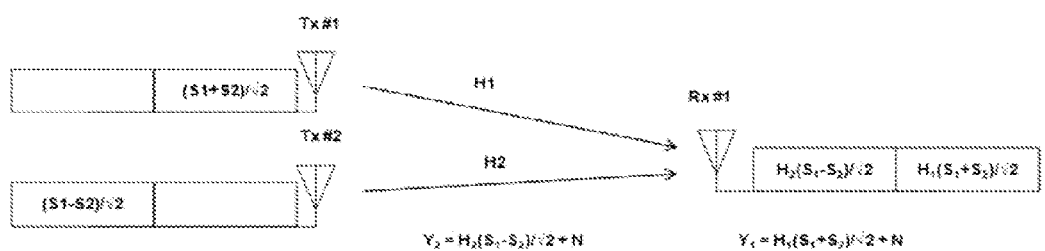
FIG. 10 is for explaining the reception of the signals transmitted based on FIG. 9.

FIG. 10 is for explaining the reception of the signals transmitted based on FIG. 9.

When the X1 and X2 are represented as the above Equation 4, and when 2 channels of transmission antennas 1 and 2 are represented as H1 and H2, the two received signals can be represented as:

$$Y_1 = H_1(S_1+S_2)/\sqrt{2}+N$$

$$Y_2 = H_2(S_1-S_2)/\sqrt{2}+N \quad \text{[Equation 5]}$$

Here, 'N' represents noise.

These received signals can be equalized as following Equations 6 and 7:

$$W_1(i)Y_1 = W_1(i)H_1(S_1+S_2)/\sqrt{2}+W_1(i)N \quad \text{[Equation 6]}$$

Where, $$W_1(1) = H_1^*/\sqrt{2}|H_1|^2$$

$$W_1(2) = H_2^*/\sqrt{2}|H_2|^2$$

$$W_2(i)Y_2 = W_2(i)H_2(S_1-S_2)/\sqrt{2}+W_2(i)N \quad \text{[Equation 7]}$$

Where, $$W_2(1) = H_2^*/\sqrt{2}|H_2|^2$$

$$W_2(2) = H_1^*/\sqrt{2}|H_1|^2$$

In case of i=1, the above 2 signals can be summed as following:

$$\begin{aligned} W_1(1)Y_1 + W_2(1)Y_2 &= W_1(1)H_1(S_1+S_2)/\sqrt{2}+ \\ &\quad W_2(1)H_2(S_1-S_2)/\sqrt{2}+ \\ &\quad W_1(1)N + W_2(1)N \\ &= (W_1(1)H_1 + W_2(1)H_2)S_1/\sqrt{2}+ \\ &\quad (W_1(1)H_1 - W_2(1)H_2)S_2/\sqrt{2}+ \\ &\quad W_1(1)N + W_2(1)N \\ &= (|H_1|^2/|H_1|^2 + |H_2|^2/|H_2|^2)S_1/2+ \\ &\quad (|H_1|^2/|H_1|^2 - |H_2|^2/|H_2|^2)S_2/2+ \\ &\quad W_1(1)N + W_2(1)N \\ &= S_1 + W_1(1)N + W_2(1)N \end{aligned}$$
[Equation 8]

In case of i=2, the above 2 signals can be summed as following:

$$\begin{aligned} W_1(2)Y_1 + W_2(2)Y_2 &= (H_1H_2^*/|H_2|^2 + H_2H_1^*/|H_1|^2)S_1/2+ \\ &\quad (H_2H_1^*/|H_1|^2 - H_1H_2^*/|H_2|^2)S_2/2 + W_1(2)N + W_2(2)N \end{aligned}$$
[Equation 9]

The above mathematical modeling reveals that this scheme provides spatial diversity gain and better detection probability.

In the following, as another aspect of the present invention, method for spatial modulation by using the reference signals is explained.

In the conventional art, the reference signals (RSs) are used to estimate channel condition and/or to demodulate the received data based on the estimated channel. In MIMO technology, the reference signals are transmitted via each of antennas and they are used for estimating channel for each antenna.

On the other hand, one example of the present invention proposes to define the antenna(s) and/or antenna pattern for transmitting RSs, and this selection of antenna (pattern) is used to represent information other than the conventional information for RSs transmission.

Figure 11:
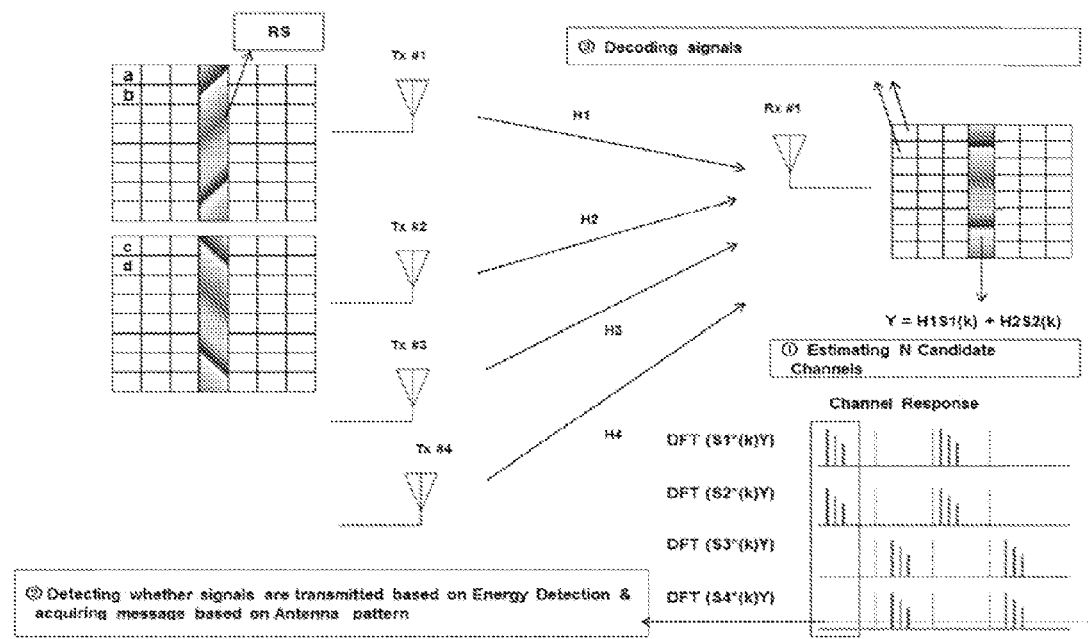
FIG. 11 is a diagram for explaining spatial modulation scheme based on the RS signals.

FIG. 11 is a diagram for explaining spatial modulation scheme based on the RS signals.

As exemplified in FIG. 11, suppose that there are 4 transmission antennas (Tx #1~Tx #4). In this example, the combination of RS 1 (a, b) and RS 2(c, d) is transmitted with the antenna pattern of (1, 2), (3, 4), (2, 1) and (4, 3), where (x, y) represents antenna x is used for transmitting RS 1 and antenna y is used for transmitting RS 2. As a first step (①), the receiving side device may estimate 4 candidate channels based on the received RS signals. On the other hand, detection of antenna pattern used for transmitting RS signals is performed (e.g. energy detection) (Step ②).

The information acquired by step ① (first information) can be used for decoding signals (step ③) as the conventional RSs do. But, the information acquired by step ② (second information) can represent new type of information specifically designed for the present invention.

The newly designed information can comprise modulation order for data transmission, and/or additional information in addition to control information to be transmitted via control channel (e.g. hierarchical modulation triggering flag).

Also, this information can represent transmission scheme for data transmission. For example, when the RSs are detected at one antenna among multiple antennas, it may represent that the data shall be transmitted via single beamforming scheme. As another example, when the RSs are detected at two transmission antennas, it may represents that data shall be transmitted by dual beamforming scheme. Still another example, when the RSs are detected at multiple antennas and antenna selection pattern is changed within a predetermined time period, it may represent that the transmission scheme for data transmission shall be changed.

In another example, the new information can represent HARQ ACK/NACK for data transmission.

In further another example, the new information can represent the number of antennas for spatial modulation of data. For example, when the RSs are detected at N antennas, it may represent that the N antennas are used for spatial modulation of data. Also, a combination of the number of antennas in which RSs are detected and the antenna pattern may represent the number of antennas for spatial modulation of data. And, the new information can represent the antenna pattern for spatial modulation of data.

Figure 12:
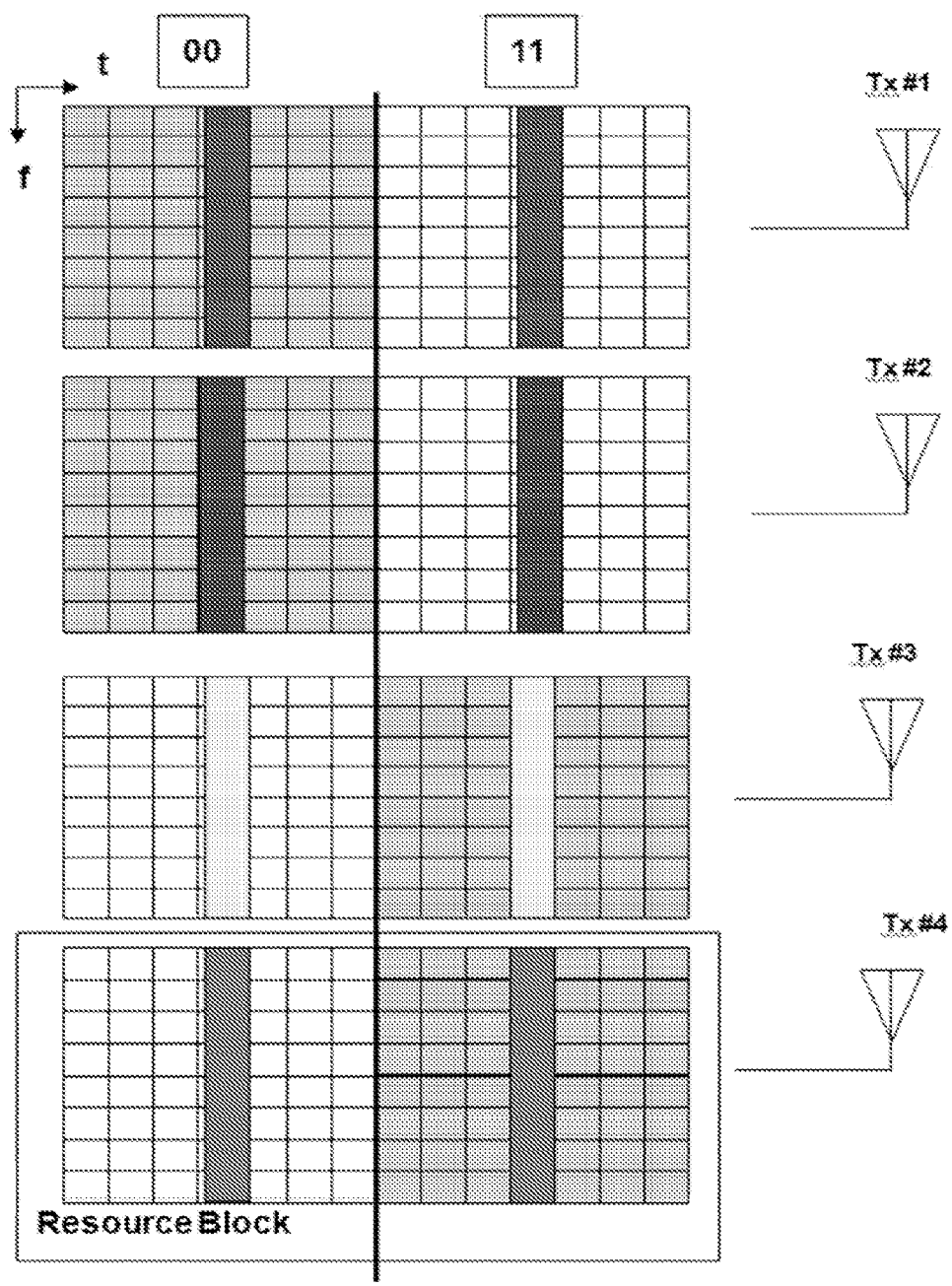
FIG. 12 is a diagram for explaining another example of the present invention for spatial modulation by using RSs.

FIG. 12 is a diagram for explaining another example of the present invention for spatial modulation by using RSs.

In this example, the time-frequency resource used for RSs transmission is further used for representing new information. In FIG. 12, there are two resource blocks for transmitting RSs at each transmission antenna. Different selection of resource block for transmitting RSs can be further used together with different selection of antenna to represent new information.

The reference signals to be used by the present invention may comprise various sequence, such as Zadoff-Chu sequence used for LTE/LTE-A system.

According to another aspect of the present invention, the spatial modulation scheme can be modified by configuring the combination of antennas.

According to this example of the present invention, when there are N transmission antennas, M antenna ports are configured from among N antennas. (M=<N). The M antenna port may comprise an antenna port configured as a combination of two or more antennas selected from among the N antennas. For example, when there are 4 transmission antennas, and each channel is represented as H1, H2, H3 and H4, the M antenna ports can be configured as following:

$$Heq1=(H1+aH2)$$

$$Heq2=(H3+bH4)$$

$$Heq3=(H1+cH3)$$

$$Heq4=(H2+dH4) \quad \text{[Equation 10]}$$

Here, 'a', 'b', 'c', and 'd' may represent weight for each channel. For example, M antenna ports may comprise a antenna port binding k antennas with phase shift. These M antenna ports can be used for beamforming, PVS and/or CDD.

The method may further comprise selecting L antenna pairs for data transmission from among the M antenna ports based on Alamouti coding, where L<M. Example of Alamouti coding combination can be represented as:

Candidate 1. $|Heq1|^2+|Heq2|^2$

Candidate 2. $|Heq3|^2+|Heq4|^2$ [Equation 11]

The transmitting side device (e.g. eNB) may transmit data by using the selected L antenna candidates. The receiving side device (e.g. a user equipment) may perform the blind decoding by using Alamouti coding and antenna port configuration.

Figure 13:
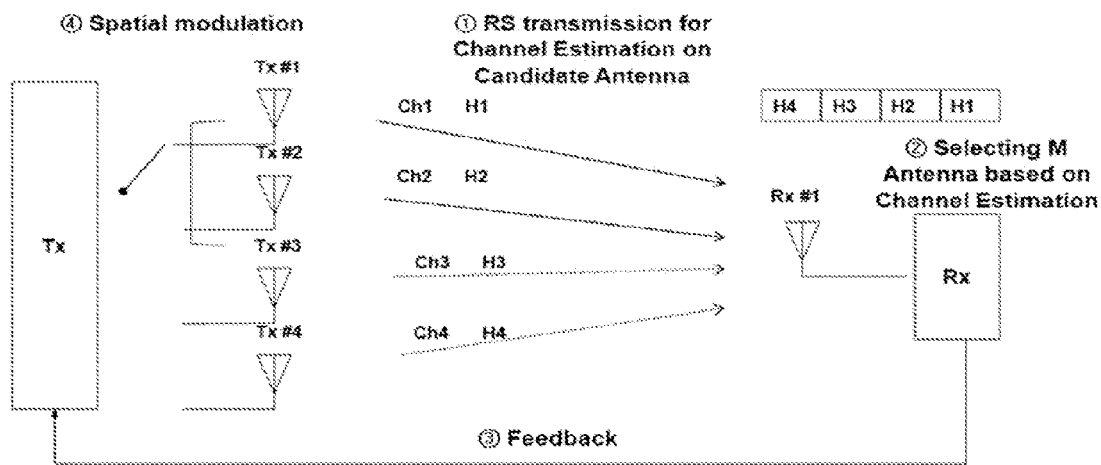
FIG. 13 is a diagram for explaining the spatial modulation scheme according to one embodiment of the present invention.

FIG. 13 is a diagram for explaining the spatial modulation scheme according to one embodiment of the present invention.

At step 1, the transmitting side device may transmit RS for channel estimation on the candidate antenna. In this example, the transmission of RS is performed via Tx #1~Tx #4. At step 2, the receiving side device may select M antennas based on the channel estimation. For example, the receiving side device may select Tx #1, #2 and #3 for data transmission. At step 3, the information on the selected M antennas may feed back to the transmitting side device. Also, the receiving side device may feed back the channel estimation information for all of H1~H4. At step 4, the transmitting side device may configure 2 antenna ports for data transmission and configure antenna port 1 as a combination of Tx #1 and Tx #2, and antenna port 2 from Tx #3. Then, the transmitting side device may transmit data via the above configured antenna ports 1 and 2.

In the above explanation, the antenna may comprise physical antenna, virtual antenna configured by multi-layer beamforming.

When the information is represented by the transmission antenna used for signals, the amount of information to be represented is determined based on the number of transmission antennas. For example, when there are 4 transmission antennas, the information of 2 bits can be represented based on the basic spatial modulation. When there are 8 antennas, 3 bits can be transmitted.

On the other hand, when virtual antenna part configured as stated above, the amount of information to be transmitted can increase. For example, when there are 4 transmission antennas and 2 transmission antennas are to be selected for configuring one virtual antenna port, there are 6 cases for this configuration. When selecting 2 antennas from among 8 antennas, there are 28 cases to be represented, so 4 bits information can be delivered.

But, the more the combinations are defined, the more complex the detection of the receiving side device becomes.

So, according to one example of the present invention, the antenna ports are configured to have each antenna for equal frequency. When selecting 2 antennas from 4 antennas, there can be 6 candidates for combination. And, when selecting 4 candidate for combination from the above 6 candidates, there are 15 methods for this configuration.

If a specific antenna is more frequently selected comparing to the other antennas, such as '1 (1,2) (1,3) (1,4) (2,3)|2 (1,2) (2,3) (2,4) (3,4) . . . ', the specific defect on that antenna may influence the overall performance (even though it may be averaged by using the spatial modulation scheme as proposed above). So, in this example, each antenna is selected with substantially equal frequency to be used for configuring the virtual antenna port. For example, the antenna ports 1, 2, 3 may be configured as '1 (1,2) (1,3) (2,4) (3,4)|2 (1,2) (1,4) (2,3) (3,4)|3 (1,3) (1,4) (2,3) (2,4) . . . '

In order to implement the above scheme, the transmitting side device shall inform the receiving side device the number of antennas to be used for transmitting signals, and how the antenna ports are configured. In another example, the transmitting side device may inform the receiving side device of the number of antennas used for transmitting signals, and the configuration information of the antenna ports may be acquired based on the resource mapping.

The above antenna port configuration may vary for each transmission symbol. As mentioned before, the defect specific to a specific antenna may influence the overall performance of the above transmission scheme. So, frequently changing the antenna port configuration may help this problem. For this end, the transmitting side device may inform the receiving side device of how the antenna port configuration changes.

Figure 14:
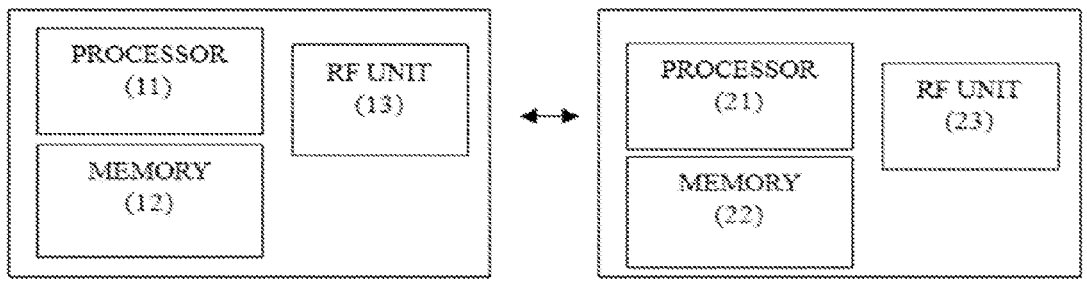
FIG. 14 is a block diagram for a configuration of a communication device according to one embodiment of the present invention.

FIG. 14 is a block diagram for a configuration of a communication device according to one embodiment of the present invention.

Referring to FIG. 14, a communication device may be configured by including a processor 11, a memory 12 and an RF module 13. The communication device can communicate with a different communication device that includes the above-mentioned configuration 21, 22 and 23.

One communication device shown in FIG. 14 may include a UE, while the other may include a base station. The communication device shown in FIG. 14 is illustrated for clarity of the description and modules included in the communication device may be omitted in part. And, the communication device may further include necessary module(s).

The processor 11/21 in the communication device can perform most of controls for implementing the above-described methods according to the embodiments of the present invention. The memory 12/22 is connected to the processor 11/21 so as to store necessary information. The RF unit 13/23 transceives radio signals and is able to forward them to the processor 11/21.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment.

Embodiments of the present invention can be implemented using various means. For instance, embodiments of the present invention can be implemented using hardware, firmware, software and/or any combinations thereof. In case of the implementation by hardware, one embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A transmitting side device for sending additional information by using a transmission pattern in a wireless communication system, the device comprising:
   a RF unit connected to multiple antennas, and configured to transmit reference signals (RSs) via the multiple antennas with a specific RS transmission pattern, selected from among multiple RS transmission patterns, to a receiving side device;
   a memory storing the multiple RS transmission patterns; and
   a processor connected to the RF unit and the memory, and configured to control the RF unit to communicate data with the receiving side device based on the additional information,
   wherein the RSs are used by the receiving side device for one or more of channel estimation and data demodulation, and
   wherein the specific RS transmission pattern is used by the receiving side device for acquiring the additional information.

2. The device of claim 1, wherein the additional information comprises one or more of modulation order of the data to be transmitted, which of MIMO transmission schemes is used for data transmission, and information for spatial modulation for the data transmission.

3. The device of claim 1, wherein the multiple RS transmission patterns are determined based on a number of antennas used for transmitting the RSs.

4. The device of claim 1, wherein the multiple RS transmission patterns are determined based on a sequence of antenna numbers used for transmitting the RSs.

5. The device of claim 1, wherein the multiple RS transmission patterns are determined by using different time-frequency resources of each antenna.

6. A method of sending additional information by using a transmission pattern in a wireless communication system, the method comprising:
   transmitting reference signals (RS s) via multiple antennas with a specific RS transmission pattern, selected from among multiple RS transmission patterns, to a receiving side device,
   wherein the RSs are used by the receiving side device for one or more of channel estimation and data demodulation, and
   wherein the specific RS transmission pattern is used by the receiving side device for acquiring the additional information, and
   communicating data with the receiving side device based on the additional information.

7. The method of claim 6, wherein the additional information comprises one or more of modulation order of the data to be transmitted, which of MIMO transmission schemes is used for data transmission, and information for spatial modulation for the data transmission.

8. The method of claim 6, wherein the multiple RS transmission patterns are determined based on a number of antennas used for transmitting the RSs.

9. The method of claim 6, wherein the multiple RS transmission patterns are determined based on a sequence of antenna numbers used for transmitting the RSs.

10. The method of claim 6, wherein the multiple RS transmission patterns are determined by using different time-frequency resources of each antenna.

* * * * *